United States Patent [19]
Harper

[11] Patent Number: 6,037,754
[45] Date of Patent: Mar. 14, 2000

[54] SMPS WITH INPUT VOLTAGE SENSING VIA BOOST INDUCTOR CURRENT SENSING

[75] Inventor: Raymond G. Harper, 2502 Wildhorse Dr., San Ramon, Calif. 94583

[73] Assignee: Raymond G. Harper, San Ramon, Calif.

[21] Appl. No.: 08/879,418

[22] Filed: Jun. 20, 1997

[51] Int. Cl.[7] .................................................. G05F 1/613
[52] U.S. Cl. .......................................... 323/222; 323/285
[58] Field of Search ..................................... 323/222, 282, 323/283, 284, 285

[56] References Cited

U.S. PATENT DOCUMENTS

| | | | |
|---|---|---|---|
| 3,913,000 | 10/1975 | Cardwell | 323/222 |
| 4,672,300 | 6/1987 | Harper | 323/222 |
| 5,001,620 | 3/1991 | Smith | 323/285 |
| 5,180,964 | 1/1993 | Ewing | 323/285 |
| 5,508,602 | 4/1996 | Borgato et al. | 323/222 |
| 5,617,013 | 4/1997 | Cozzi | 323/282 |
| 5,644,214 | 7/1997 | Lee | 323/222 |
| 5,757,166 | 5/1998 | Sodhi | 323/222 |
| 5,757,635 | 5/1998 | Seong | 323/222 |
| 5,818,707 | 10/1998 | Seong et al. | 323/285 |
| 5,905,369 | 5/1999 | Ishii et al. | 323/222 |
| 5,923,154 | 7/1999 | Moller | 323/284 |

OTHER PUBLICATIONS

"Power Factor Controller ML4812", Micro Linear, Sep. 1989, pp. 5–20 through 5–30.

*Primary Examiner*—Jeffrey Sterrett
*Attorney, Agent, or Firm*—Gregory T. Kavounas; Edward B. Anderson

[57] ABSTRACT

A switched mode power supply circuit is provided that converts an input DC or AC voltage to a constant DC output voltage. The circuit uses a combination of a switch and an inductor at the output stage. When the switch is open, a current through the inductor decreases linearly until it reaches zero. Then the switch is closed, and the inductor current increases linearly until it reaches an upper limit, at which time the switch is opened, and the inductor current starts decreasing again. The upper limit of the inductor current is computed by a support circuit, and thus it does not need to be provided by sensing the input voltage independently. The computation uses the durations ratio D of a recent fall time duration of the inductor current divided by a recent rise time duration of the inductor current. The maximum inductor current is computed by multiplying a constant current value by $D \times (1+D)$. The result is a circuit with resistive only input impedance. The computation is further adapted to account for changes in the actual output voltage with changing load conditions. A fast reacting circuit reduces the computed maximum inductor current to nearly zero, if an overvoltage load condition is detected. A slow reacting circuit adjusts the computed maximum inductor current continuously to maintain the output voltage equal to a nominal output voltage. An efficient analog computation circuit is disclosed for performing the computation, and for adjusting for changes in the load conditions.

10 Claims, 5 Drawing Sheets

SMPS WITH INPUT VOLTAGE SENSING VIA BOOST INDUCTOR CURRENT SENSING

BACKGROUND OF THE INVENTION

1. Field of the Invention

The present invention relates to the field of switched mode power supply circuits that convert an input DC voltage or AC voltage (such as line power) to a constant DC output voltage.

2. Description of Related Art

Switched mode power supply circuits use a combination of a switch and an inductor at the output stage. A Pulse Width Modulation (PWM) regulator turns the switch successively ON (conducting) and OFF (not conducting), for times $T_{ON}$ and $T_{OFF}$ respectively. A current through the inductor increases when the switch is ON, and decreases when the switch is OFF. The result is a constant DC voltage at the output stage.

Some power supply circuits need to sense the line voltage independently. This sensing is to assist in controlling the PWM regulator, and thus in controlling the times $T_{ON}$ and $T_{OFF}$. These times are controlled such that the line current remains substantially in phase with the line voltage at each instant of the line voltage cycle. This will cause the current drawn from the power supply circuit to exhibit no harmonic distortion, and the input impedance of the circuit to be resistive only.

Although a resistive only input impedance is desirable, independent sensing of the line voltage is problematic. It is undesirable to use a resistive divider, because that would be connecting the high line voltage directly to the PWM regulator. This is even less desirable where the PWM regulator is to be implemented by an integrated circuit, as is preferred for control circuitry of that type. In some prior art embodiments, the line voltage is sensed by independent circuitry that has a frequency response fast enough to follow a 60 Hz sine wave variation. Such circuitry has been implemented in the prior art by a transformer. This implementation, however, needs to be implemented with large magnetic components to not produce error. Additionally, it can not be adapted to handle DC input power, because it relies on attributes of AC line power that are absent from a DC waveform.

U.S. Pat. No. 4,672,300 discloses a circuit where the switch is turned ON and OFF when the inductor current magnitude reaches lower and upper limits respectively. A PWM regulator is thus no longer necessary, as times $T_{ON}$ and $T_{OFF}$ are not controlled directly. In addition, this technique does achieve a resistive only input impedance, but only because it senses independently the rectified input line voltage, and uses it to set the upper limit of the inductor current. The lower limit of the inductor current is set advantageously at exactly zero. An inductor current with a lower limit at exactly zero is called "just discontinuous", and it results in additionally obviating the need for a snubber circuit, and in minimizing switching and inductor losses.

SUMMARY OF THE INVENTION

The present invention overcomes the prior art problem of requiring that the input voltage be sensed independently.

Generally, the present invention provides a switched mode power supply circuit that converts an input DC voltage to a constant DC output voltage. The circuit is readily adaptable to convert AC line power, by simply rectifying it to a DC voltage at the input stage.

More specifically, the circuit uses a combination of a switch and an inductor at the output stage. When the switch is open (OFF), a current through the inductor decreases linearly until it reaches zero. Then the switch is closed (ON), and the inductor current increases linearly. Accordingly, the inductor current waveform is just discontinuous, resulting in the aforementioned advantages. When the inductor current value reaches an upper limit, the switch is opened (OFF), and the inductor current starts decreasing again. The upper limit of the inductor current is computed by a support circuit, and thus it does not need to be provided by sensing the input voltage independently.

In the preferred embodiment of the invention, the computation is such that the circuit has resistive only input impedance. The upper limit is computed from the durations ratio D, which equals the ratio of the resulting values of fall and rise time durations of recent decreases and increases of the inductor current. Specifically, the maximum inductor current is computed by multiplying a constant current value by a factor of $D\times(1+D)$.

The computation is further adapted to account for changes in the actual output voltage with changing load conditions. A voltage reference means provides a nominal output voltage for comparison with the actual output voltage. A fast reacting circuit reduces the computed maximum inductor current to nearly zero, if an overvoltage load condition is detected. Additionally, a slow reacting circuit adjusts the computed maximum inductor current continuously to maintain the output voltage equal to the nominal output voltage.

Further according to the invention, an analog computation circuit is disclosed for performing the above computation, and for adjusting for changes in the load conditions. The computation circuit achieves the computation with a minimum number of components and with a fast reaction time.

Another advantage of this invention is that the circuit has a robust topology that does not require the component values to be subject to close tolerances. The topology additionally minimizes the complexity of the magnetic assemblies, which is one of the main cost factors of most power supply circuits. Additionally, implementation of this topology is compatible with integrated circuit technologies.

These and other features and advantages of the present invention will be apparent from the preferred embodiment described in the following detailed description, and illustrated in the accompanying drawings.

DETAILED DESCRIPTION OF THE PREFERRED EMBODIMENT(S)

As has been mentioned, the invention provides a switched mode power supply circuit that uses a combination of a switch and an inductor at the output stage to deliver a constant DC voltage from an input DC voltage. The circuit components of the power supply circuit are now described with reference to FIGS. 1 and 2.

Circuit 16 includes two power input terminals 18, 20 at input stage 21. It is preferred that the first power input terminal 18 be connected to the load ground. The power input terminals receive a DC input voltage $V_{IN}$ across them, which need not be of a constant value. In fact, it can be a rectified sine wave of AC power, such as line power, the waveform of which is briefly seen in FIG. 4A.

Figure 2:
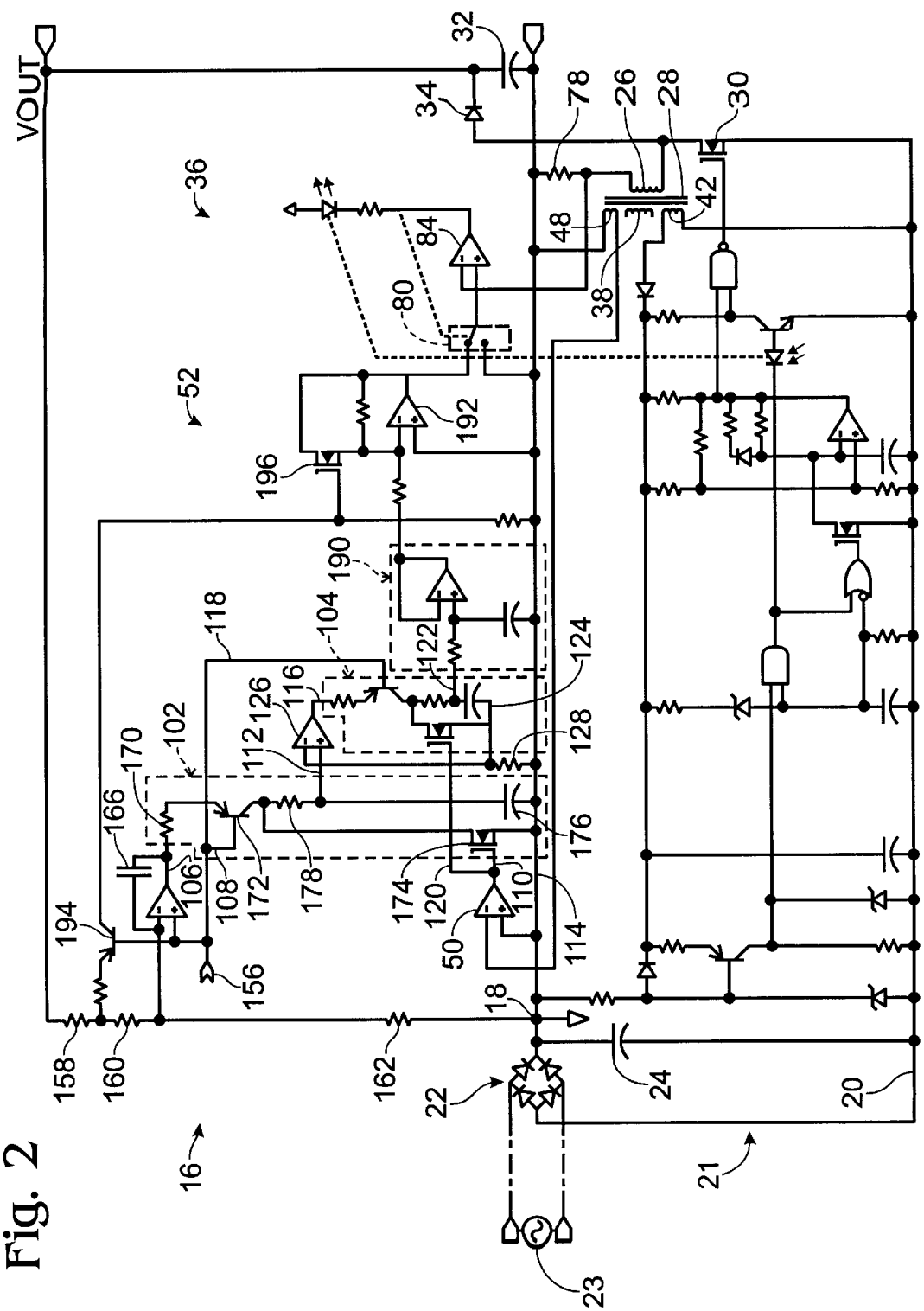
FIG. 2 is a schematic of an electrical circuit showing detailed implementation of some of the components shown in FIG. 1.

Referring briefly to FIG. 2, the input stage 21 of circuit 16 has been adapted to receive and rectify an AC voltage. Specifically, a diode bridge rectifier 22 is connected such that it can receive an AC voltage from AC voltage source 23, and produce a rectified input voltage across power input terminals 18 and 20. A capacitor 24 is further connected across the power input terminals. It is important that the capacitor have a large enough value to supply the high frequency currents associated with the switched mode operation, but not so large as to cause a significant phase shift of the line current.

Returning to FIG. 1, circuit 16 includes an inductor 26 that has two terminals. The first inductor terminal is coupled to the first power input terminal 18. The second inductor terminal is also known as the output terminal. The inductor is preferably implemented as a winding on a transformer 28, for reasons that will be understood below.

Circuit 16 includes a power switch 30 that is also referred to simply as switch. The switch responds to opening and closing switching signals for respectively opening and closing the switch. The switch has a first terminal coupled to power input terminal 20, and an output terminal coupled to the inductor's output terminal. When switch 30 is closed (ON), inductor 26 is coupled to power input terminal 20. As a result, current flowing through the inductor increases in magnitude. When the switch is open (OFF), the inductor becomes uncoupled from power input terminal 20, and the inductor current magnitude decreases. Switching is preferably designed at a frequency of at least 20 kHz. As such, the switch is preferably implemented as a Field Effect Transistor.

Circuit 16 further includes a capacitor 32 that is otherwise known as energy storage means 32. The capacitor has a first terminal and an output terminal, across which there is formed the output voltage $V_{OUT}$ of the circuit. The first capacitor terminal is coupled to the first inductor terminal. The capacitor output terminal is coupled to the output terminal of inductor 26, preferably through a diode 34 to isolate capacitor 32 when switch 30 is closed. It is preferred that capacitor 32 is of large value, to help smooth the output voltage $V_{OUT}$.

Circuit 16 also includes other components that are known collectively as support circuit 36. As seen briefly in FIG. 2, most of the support circuit can be powered from a power winding 38 that can be formed on transformer 28. In other words, the support circuit is powered only when there is current flowing through the inductor.

Returning to FIG. 1, the support circuit includes a Switch Control circuit 40 that is coupled to switch 30. The Switch Control circuit generates closing switching signals and opening switching signals for respectively closing and opening the switch. The regular operation of Switch Control circuit 40 can be assisted by an auxiliary winding 42 (seen briefly in FIG. 2) formed on transformer 28. Before the regular operation is established, Switch Control circuit 40 can be assisted by Startup Oscillator circuit 44. A person having ordinary skill in the art will discern how to implement these circuit components in view of the present description and specific design parameters.

Support circuit 36 further includes inductor current sensing means. The inductor current sensing means includes a Durations Ratio Sensor circuit 46. Durations Ratio Sensor circuit 46 senses the durations ratio D of the circuit. The durations ratio is defined as the ratio of a fall time duration of a recent decrease of the inductor current divided by a rise time duration of a recent increase of the inductor current. It is preferred that the Durations Ratio Sensor circuit senses the durations ratio by first sensing the time durations of the increases and decreases of the inductor current continuously.

It is further preferred that sensing of the inductor current happens directly. A direct implementation is preferred to one where other circuit components could give rise to timing errors. FIG. 2 shows such a direct implementation, with a sense winding 48 formed on transformer 28. Signals from winding 48 are transmitted to a comparator 50 that is configured as a zero crossing detector. The comparator thus outputs a digital pulsed signal that has one value (e.g. HIGH) while the inductor current is increasing, and the other value (e.g. LOW) while the inductor current is decreasing. Which value corresponds to which direction of the current is a matter of design choice. The ratio of the time in the LOW state divided by the time in the HIGH state is defined as the duty ratio of the pulsed signal for purposes of this disclosure. The duty ratio thus corresponds to the durations ratio D, which means that the duty ratio equals either D or 1/D, depending on the above design choice.

Returning to FIG. 1, support circuit 36 also includes a Computation circuit 52 for computing the maximum value that the inductor current magnitude is allowed to reach. The Computation circuit is also known as means for computing the maximum inductor current. Computation circuit 52 receives at least duration ratio inputs from Duration Sensor circuit 46, and factors them in the computation.

Circuit 16 of the invention optionally and preferably also tracks the output voltage $V_{OUT}$, for variations caused by changing load conditions. Briefly, the results of such tracking are also input in the Computation circuit, which adjusts the computation of the maximum inductor current accordingly.

A component for such tracking is a Voltage Reference circuit 54. The Reference circuit provides a nominal output voltage, i.e. a reference value of the desired output voltage. The difference of the actual output voltage from the nominal output voltage is called the output potential difference. Under normal operating conditions, the output potential difference is zero.

The circuit tracks the output potential difference by two monitoring circuits. The first monitoring circuit, also known as the slow reacting circuit, is implemented by an Error Detection circuit 64. Circuit 64 is made slow reacting by having a time constant long enough to remove high frequency features from the output voltage line. If the output potential difference starts to deviate from zero slowly, the Error Detection circuit continuously adjusts the computed value of the maximum inductor current in such a way that the output potential difference is returned to zero.

The second monitoring circuit, also known as the fast reacting circuit, protects the circuit against sudden changes in load conditions. The second monitoring circuit is implemented by Over Voltage Detection circuit 68. When the output potential difference changes suddenly, Detection circuit 68 adjusts the computed value of the maximum reference current to near zero.

The inductor current sensing means of support circuit 36 further includes a Current Magnitude Sensor circuit 76, for sensing the magnitude of the current through inductor 26. As seen briefly in FIG. 2, a simple embodiment for the Current Magnitude Sensor circuit is a small valued resistor 78, through which the inductor current is forced. The magnitude of the inductor current can thus be represented by a proportional voltage drop across the resistor.

The support circuit additionally includes a current comparing means for comparing the inductor current to reference currents. Specifically, the current comparing means compares the inductor current to a reference current that is approximately equal to the computed maximum inductor current, and to a zero reference current that is approximately equal to a zero current. The reference currents are theoretically exactly equal to the respective values that define them. In practice, however, they are made only approximately equal, to compensate for component tolerances and propagation delays. The current comparing means produces inputs that are transmitted to the Switch Control circuit for generating opening and closing switching signals. If the Current Magnitude Sensor circuit has been implemented by a resistor 78 as described above, and if the values of the reference currents are also represented by voltages, then the current comparing means can be implemented by common voltage comparator means. A usual such implementation is by using two voltage comparator circuits, one for each reference current.

Figure 1:
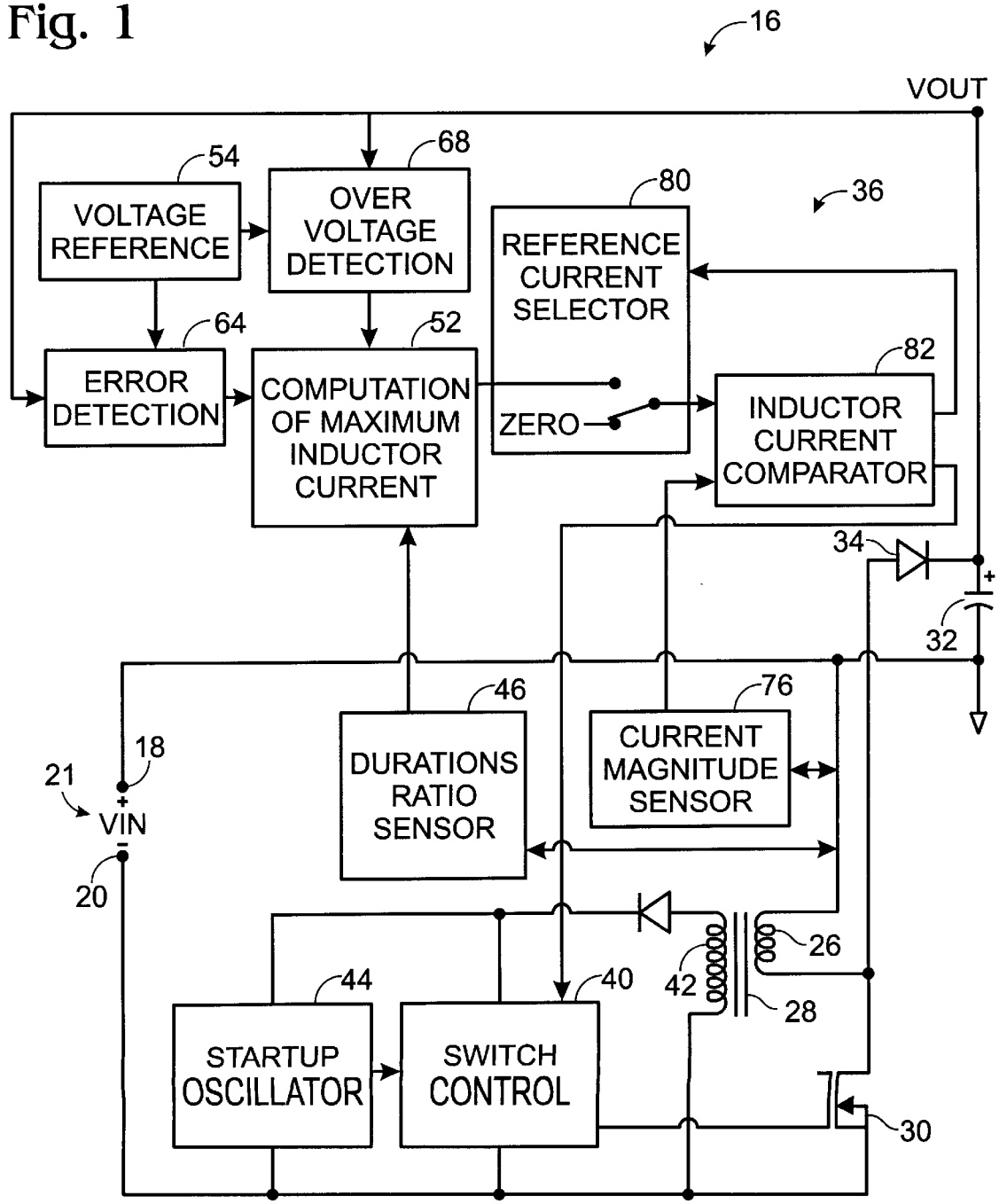
FIG. 1 is a high level diagram of the main circuit components of a switched mode power supply circuit made according to the preferred embodiment of the invention.

According to another aspect of the invention, the current comparing means is implemented by a Reference Current Selector circuit 80, and an Inductor Current Comparator circuit 82, seen in FIG. 1. The Selector circuit, which is also known as a reference current selecting means, has an output terminal and at least two input terminals. At each input terminal there is applied a signal corresponding to one of the reference currents that is to be compared to the sensed inductor current. The output terminal becomes coupled to only one of the input terminals at a time. Selector circuit 80 is responsive to event control signals that determine to which input terminal the output terminal becomes coupled.

Inductor Current Comparator circuit 82 has two input comparing terminals. The first comparing terminal is coupled to the output terminal of Reference Current Selector circuit 80. The second comparing terminal is coupled with and receives an input from Current Magnitude Sensor circuit 76. As seen briefly in FIG. 2, the Comparator circuit can be implemented as a voltage comparator 84, in accordance with what was described above. The Comparator circuit produces event control signals that are input in the Selector circuit, for selecting an appropriate reference current. It also produces inputs that are transmitted to Switch Control circuit 40 by means such as an optocoupler or equivalent.

Figure 3:
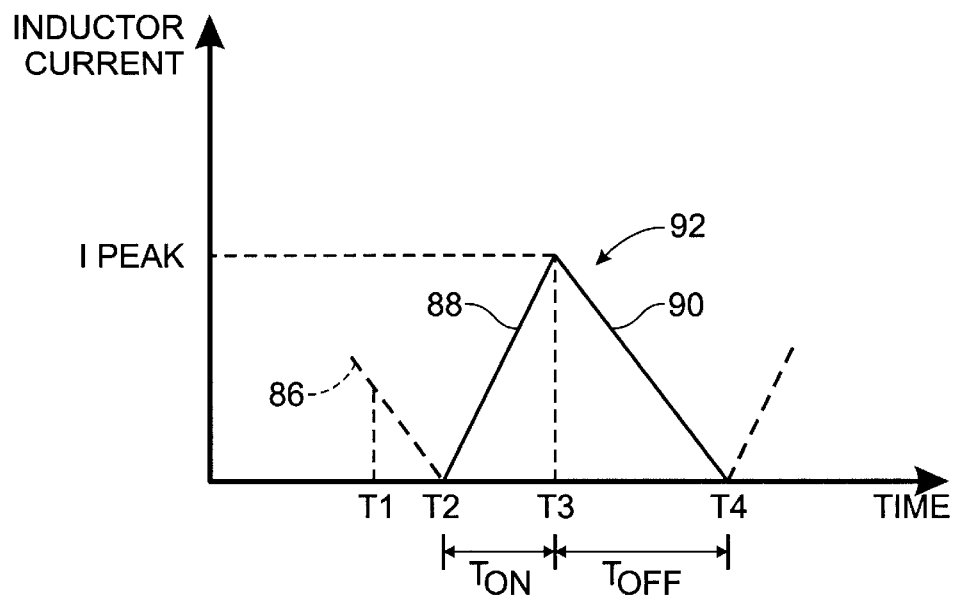
FIG. 3 is a diagram showing a time waveform of a single inductor current pulse of a current through an inductor of the circuit of FIG. 2.

The operation of these components is now described also with reference to FIG. 3. At time T1 switch 30 is open, and Inductor Current Comparator circuit 82 is comparing the inductor current to a zero reference current. Accordingly, the inductor current is decreasing, as represented by waveform segment 86.

The inductor current reaches the value of zero at time T2. At that time, the Inductor Current Comparator circuit produces two signals simultaneously. The first signal is a closing switching signal that is applied to Switch Control circuit 40. The Switch Control circuit thus closes switch 30, and the inductor current starts increasing, as represented by waveform segment 88. The second signal is an event control signal that causes Reference Current Selector circuit 80 to switch input terminals. Then the Inductor Current Comparator circuit is comparing the inductor current to a maximum inductor current that is being computed by Computation circuit 52.

At time T3, the inductor current reaches the maximum inductor current value, which is also designated as $I_{PEAK}$. At that time the Inductor Current Comparator circuit again produces two signals. The first signal is an opening switching signal to Switch Control Circuit 40. The Switch Control circuit then opens switch 30, and the inductor current starts decreasing again, as represented by waveform segment 90. The second signal is another event control signal that causes Reference Current Selector circuit 80 to switch input terminals again. Then the Inductor Current Comparator circuit is again comparing the inductor current to the zero reference current.

Since the inductor current started decreasing, the voltage across the inductor was clamped by a flyback action at $V_{OUT}$, which thus became a constant, stabilized voltage level. The rise time duration was the time duration between times T2 and T3, and thus coincides with the time that the switch was closed, namely $T_{ON}$.

The inductor current reaches the value of zero again at time T4, at which time the events of time T2 are repeated. The fall time duration was the time duration between times $T_3$ and T4, and thus coincides with the time that the switch was open, namely $T_{OFF}$.

The waveform between times T2 and T4 is also called one inductor current pulse 92. Each inductor current pulse starts from zero, includes one complete inductor current rise and fall duration, and concludes again at zero. For every inductor current pulse 92, the rate of inductor current decrease, i.e. the slope of waveform segment 90, is proportional to the output voltage $V_{OUT}$ according to the following equation:

$$V_{OUT} = -L \cdot (di/dt)(during\ T_{OFF}) \qquad (1)$$

where L is the inductance of inductor 26, and i is the inductor current.

Since $V_{OUT}$ is fixed, the inductor current decreases with the same slope for every pulse and linearly, assuming that the voltage drop across diode 34 is small compared to the output voltage $V_{OUT}$.

The rate of inductor current increase, i.e. the slope of waveform segment 88, is proportional to the input voltage $V_{IN}$ according to the following equation:

$$V_{IN} = L \cdot (di/dt)(during\ T_{ON}) \qquad (2)$$

The input voltage $V_{IN}$ can be assumed fixed for the purposes of Equation (2), i.e. during any particular rise time duration $T_{ON}$. Indeed, if the input voltage $V_{IN}$ is a constant DC voltage or a slowly varying DC voltage, then it can be considered fixed during $T_{ON}$. The same is also true if the input voltage is rectified line power, as is explained immediately below.

Figure 4A:
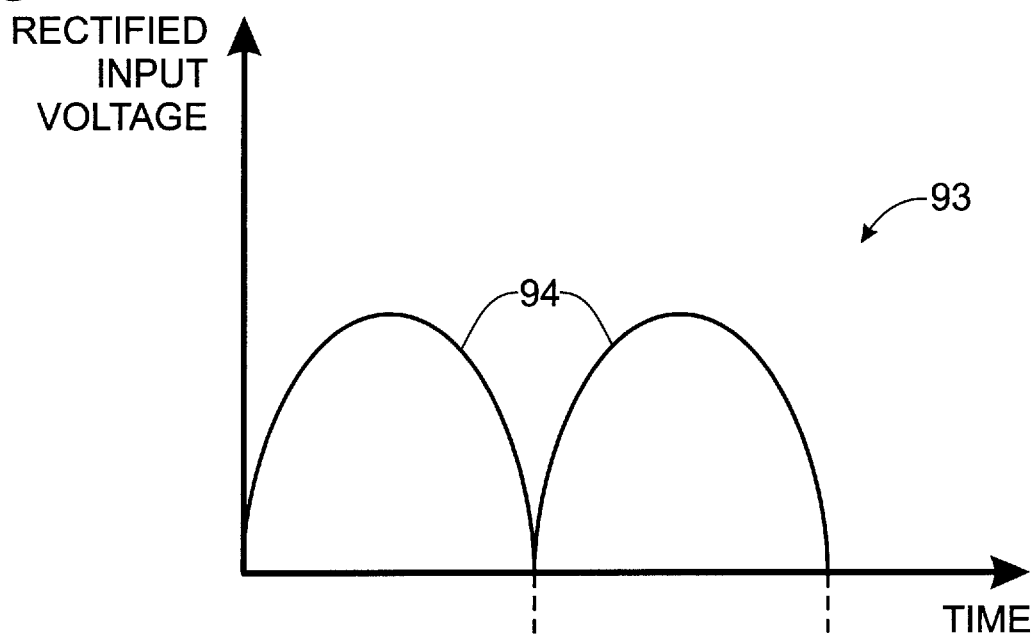
FIG. 4A is a diagram showing a time waveform of rectified AC input voltage.

FIG. 4A shows a time waveform 93 of an AC voltage, after it has been rectified at the input stage. The waveform is characterized by successive half sinusoid waves 94. If the AC voltage is considered to be at a 60 Hz frequency, then waves 94 appear at a frequency of 120 Hz. Each wave is thus substantially longer than the rise time duration $T_{ON}$ of an inductor current pulse, since inductor current switching is preferably performed at a frequency of over 20 kHz. In other words, for every wave 94 there are at least 150 inductor current pulses. Accordingly, the instantaneous value of the rectified input voltage $V_{IN}$ can be considered fixed, for any one individual current pulse.

Since the input voltage $V_{IN}$ is fixed during the rise time of an inductor current pulse, then the inductor current increases linearly per equation (2). Therefore, no slope compensation means will be necessary. However, the slope of increase will be different from one pulse to the next, if the value of the input voltage $V_{IN}$ is changing.

Further according to the invention, the support circuit optimizes the calculation of the maximum inductor current $I_{PEAK}$ of each pulse, so that the input impedance is resistive only. This is accomplished by causing the mean line current $I_{LINEM}$, averaged over one current pulse, to be proportional to the mean line voltage $V_{LINEM}$, averaged over the same pulse. This relationship can be expressed as follows:

$$I_{LINEM} = V_{LINEM} \cdot K_1 \quad (3)$$

where $K_1$ is a first constant.

The mean line current is given by:

$$I_{LINEM} = (I_{PEAK}/2) \cdot [T_{ON}/(T_{ON}+T_{OFF})] \quad (4)$$

The mean line voltage is given by:

$$V_{LINEM} = K_2 \cdot (T_{OFF}/T_{ON}) \quad (5)$$

where $K_2$ is a second constant.

Substituting equations (4) and (5) into equation (3), and solving for the maximum inductor current $I_{PEAK}$ yields:

$$I_{PEAK} \times I_0 \cdot (T_{OFF}/T_{ON}) \cdot [1+(T_{OFF}/F_{ON})] \quad (6)$$

where $I_0$ is a constant current value, that is preferably preselected.

Further, the circuit defines a durations ratio D. The durations ratio is the ratio of the durations of recent inductor current decreases and increases, which equal $T_{OFF}$ and $T_{ON}$ respectively. So, the durations ratio can be given by:

$$D = T_{OFF}/T_{ON} = V_{IN}/V_{OUT} \quad (7)$$

Substituting equation (7) into equation (6) yields:

$$I_{PEAK} = I_0 \cdot D \cdot (1+D) \quad (8)$$

Thus the optimum value of $I_{PEAK}$ may be computed from the durations ratio D of the circuit. Additionally, the optimized value of the inductor current may differ from one inductor current pulse 92 to the next.

The complete inductor current waveform is now described with reference to FIG. 4B. The complete waveform 95 is a series of successive inductor current pulses 92. Since each pulse starts from and ends at zero, the inductor current is just discontinues, which affords the aforementioned advantages. All pulses have a uniform slope of decrease. However, each pulse has its own slope of increase, and its own maximum value reached $I_{PEAK}$, as resulting from the above calculation.

The successive peaks of the individual current pulses trace out a peaks pattern. The peaks pattern resembles somewhat the waveform of the input voltage. That is because the value of the input voltage $V_{IN}$, although not independently sensed, is preserved in the slope of the rise of each inductor current pulse, plus in the way the maximum value is computed.

Figure 4B:
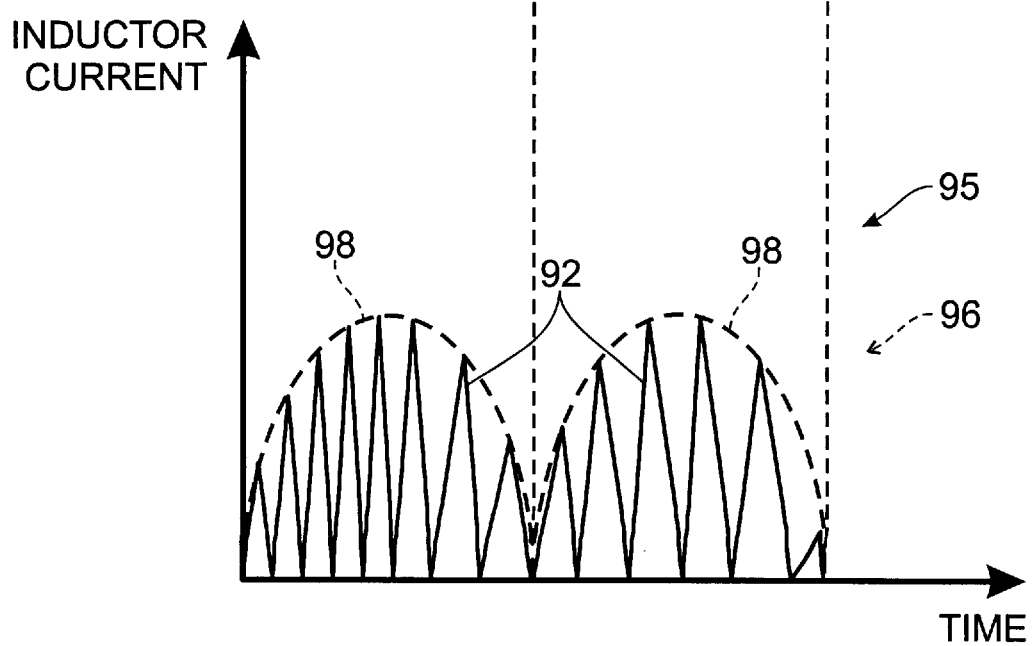
FIG. 4B is a diagram showing a time waveform of a current through an inductor of the circuit of FIG. 2.

Also seen in FIG. 4B is a specific peaks pattern 96. Such a peaks pattern is generated if the input voltage $V_{IN}$ is a rectified sinusoidal voltage, of the same shape and frequency as is shown in FIG. 4A. Peales pattern 96 has lobes 98 that seem to track half sinusoid waves 94 of the input voltage $V_{IN}$. Indeed, lobes 98 come to zero at the same times as half sinusoid waves 94 of the rectified input voltage. However, the amplitude of lobes 98 is generally not proportional to the amplitude of half sinusoid waves 94, and that is due to the (1+D) factor that multiplies the amplitude of the lobes in equation (8).

The waveform of FIG. 4B has been drawn with each inductor current pulse perceptibly different from others, so as to better elucidate the similarities and differences of the pulses. If the waveform of FIG. 4A has the 120 Hz frequency of rectified input line power, and if the resulting waveform of FIG. 4B were viewed simultaneously with that of FIG. 4A in an oscilloscope, then the inductor current pulses would appear clustered very closely together. Indeed, as was explained above, there are at least 150 inductor current pulses 92 within every lobe 98, while less than 10 are shown in FIG. 4B for clarity. An important result of this relationship is that the input voltage $V_{IN}$ changes very little from one pulse to the next; therefore, successive inductor current pulses are rely similar to each other.

Since the input voltage $V_{IN}$ changes very little from one pulse to the next, it changes even less during the rise time of any one pulse. So, the assumption made in connection with equation (2) holds generally true. It does not hold true in the rare cases where the input power is AC power at a frequency substantially higher than the 60 Hz frequency of line power, and the inductor switching frequency is not designed to be concomitantly high enough. If that happens, then the input voltage $V_{IN}$ can no longer be assumed constant over the rise time duration $T_{ON}$, and thus the inductor current will increase nonlinearly in each pulse. As a result the precision of the computation will be progressively degraded, and the input impedance will exhibit an increasingly reactive content.

As was mentioned above, the Computation circuit of the invention computes the maximum inductor current for each pulse. In view of the present description, a person of ordinary skill in the art will recognize that a Computation circuit according to the invention can be implemented in a variety of ways that include analog electronics or digital electronics or both for performing the computation of equation (8). The time durations of the recent inductor current increase and decrease used in the computation of the durations ratio can be either those of a single event, or a statistic of those of similar events, e.g. an average.

Figure 5:
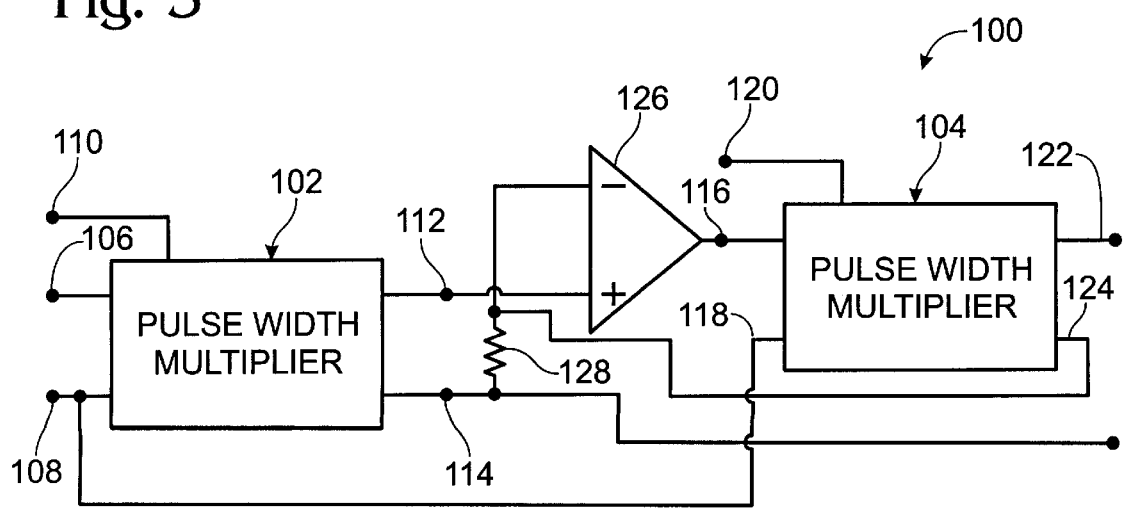
FIG. 5 is a block diagram of a factoring circuit of a Computation circuit component of FIG. 1.

The Computation circuit according to the preferred embodiment of the invention includes a factoring circuit that is now described with reference to FIG. 5. Factoring circuit 100 includes two pulse width multiplying circuits 102 and 104. Circuit 102 has two signal input terminals 106, 108, a duration sense terminal 110, and two signal output terminals 112, 114. Similarly, Circuit 104 has two signal input terminals 116, 118, a duration sense terminal 120, and two signal output terminals 122, 124. Each pulse width multiplying circuit can receive an analog input signal voltage across the input terminals. Each circuit can also receive a digital pulsed signal at the duration sense terminal. The pulsed signal can be received with respect to a signal input terminal or another terminal. Each multiplying circuit thereby outputs an output signal voltage across the signal output terminals that is proportional to the input signal voltage multiplied by the duty ratio of the pulsed signal.

The factoring circuit further includes an intermediate resistor 128 and an operational amplifier 126, that is also commonly loown as opamp 126. The non inverting terminal of the opamp is coupled to the signal output terminal 112 of multiplying circuit 102. The inverting terminal is coupled to signal output terminal 114, through intermediate resistor 128. The inverting terminal of opamp 126 is also coupled to signal output terminal 124 of multiplying circuit 104. The output terminal of opamp 126 is coupled to signal input terminal 116 of multiplying circuit 104. The output of the factoring circuit $V_{100}$ is taken as a voltage difference between terminals 122 and 114.

At duration sense terminals 110, 120, there is applied a digital pulsed signal that has a duty ratio corresponding to the durations ratio $D=T_{OFF}/T_{ON}$. In the preferred embodiment, the pulsed signal is provided by comparator 50 as LOW when the power switch is OFF, and HIGH when the power switch is ON. Thus, the duty ratio of the pulsed signal will equal the durations ratio D. Accordingly, the factoring circuit of the invention produces an output value by averaging over a number of inductor current pulses, not sampling just one pulse. That is acceptable, as the inductor current pulses change very slowly from one to the other, as explained above.

Across input terminals 106, 108 there is applied a signal that is proportional to the constant current value $I_0$. Therefore, the output voltage $V_{100}$ of the factoring circuit is:

$$V_{100}=K_3 \cdot I_0 \cdot D \cdot (1+D) \qquad (9)$$

where $K_3$ is a third constant.

It can be seen that equation (9) is the operational equivalent of Equation (8).

The preferred circuit for implementing Computation circuit 52 is now described in more detail with reference to FIG. 6. The computation of equation (8) is performed by a factoring circuit as was described above. The factoring circuit includes two Pulse Width Multiplying circuits 102, 104, shosw in dashed lines, and interconnected by opamp 126 and intermediate resistor 128. In addition, the Computation circuit also monitors the output voltage $V_{OUT}$, and adjusts the computation accordingly.

Figure 6:
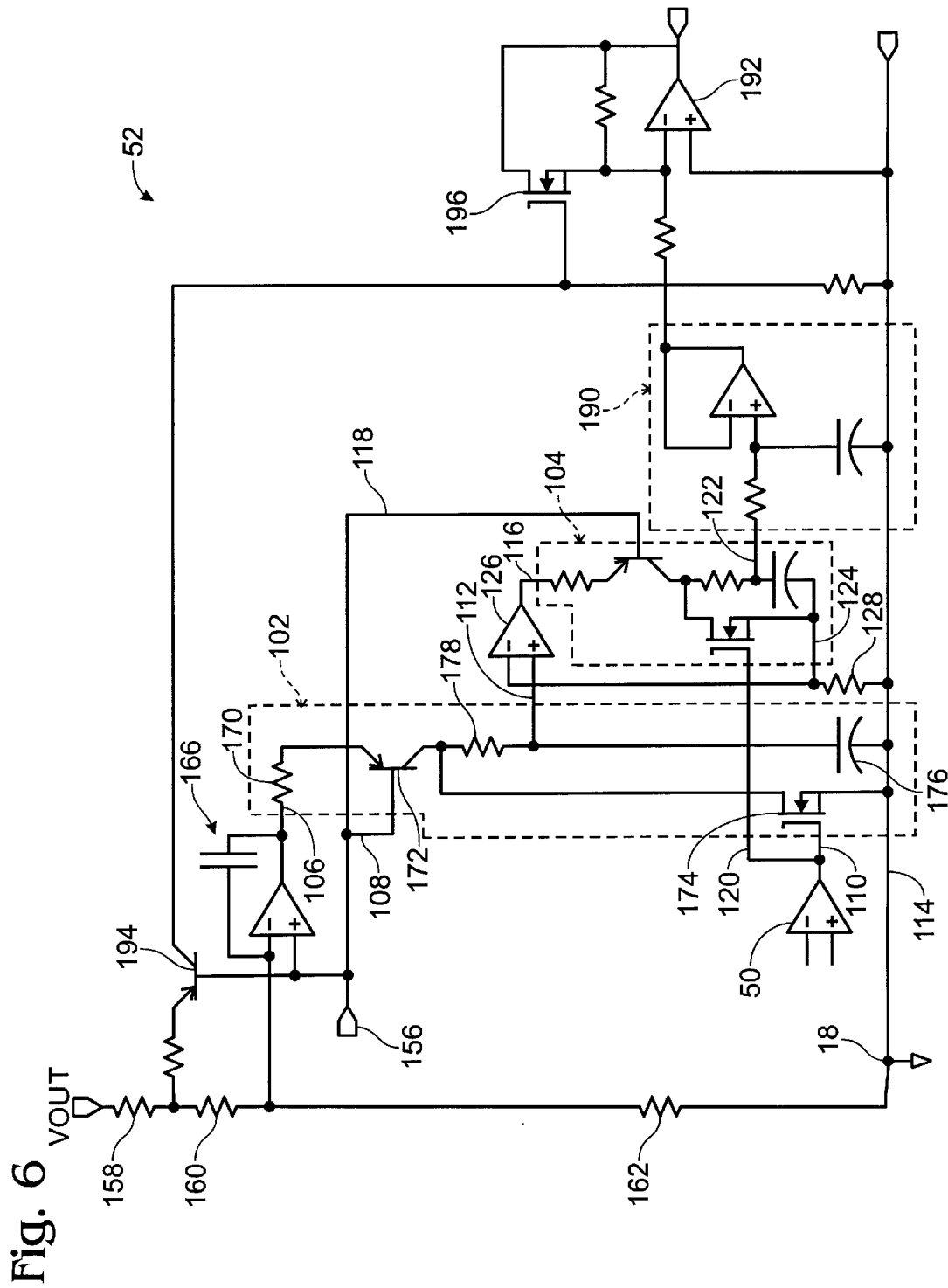
FIG. 6 is a schematic of an electrical circuit for implementing a Computation circuit component of the circuit of FIG. 1.

The Voltage Reference circuit of FIG. 1 is implemented in the circuit of FIG. 6 by a reference terminal 156 that is kept at a nominal reference voltage, e.g. 5.0 V. The output voltage $V_{OUT}$ is scaled down by a resistive divider made from resistors 158, 160 and 162. This implementation is preferred because it allows a large output voltage $V_{OUT}$ to be designed for, while the comparison for detection purposes can be made at substantially smaller voltages.

The Error Detection circuit of FIG. 1 is implemented in the circuit of FIG. 6 by an integrator 166, the output of which is connected to input signal terminal 106 of multiplier 102. The integrator integrates an error signal corresponding to a difference between the voltage at reference terminal 156, also identified as terminals 108 and 118 in FIG. 5, and a fraction of the output voltage $V_{OUT}$, provided by the combination of resistors 158, 160 and 162. An additional aspect of this implementation is that, even when the error signal is zero, integrator 166 provides a constant current of non zero value. Its values is chosen to correspond to the preselected constant current value $I_0$.

The first multiplying circuit 102 is implemented by a current resistor 170, a reference transistor 172, a duration transistor 174, a capacitor 176 and a resistor 178. Grounded terminal 18 serves both as signal input terminal, shown as terminal 114 in FIG. 5, and as signal output terminal. The signal input voltage is received by the emitter of the reference transistor through the current resistor. The base terminal of the reference transistor is coupled to the reference terminal 156, and is thus kept at the nominal reference voltage. The signal input voltage thus emerges as a proportional current signal from the collector of reference transistor 172. The duration transistor has a control terminal and two current carrying terminals. The control terminal is connected to the output terminal of comparator 50, thus receiving a digital pulsed signal that is LOW during $T_{OFF}$ and HIGH during $T_{ON}$. The duration transistor is preferably implemented as a Field Effect Transistor to accommodate high switching speeds.

During $T_{OFF}$, the current from the collector terminal of reference transistor 172 charges capacitor 176 through resistor 178. During $T_{ON}$, the same current is shunted to ground terminal 18 through duration transistor 174. Simultaneously, capacitor 176 is also being discharged through resistor 178. Accordingly, one more reason for the duration transistor to be implemented as a Field Effect Transistor is so that it will drain the capacitor charge free from the saturation voltage that characterizes current transistors. The time constant of the resistor—capacitor combination is designed to be longer than the predicted durations of $T_{ON}$ and $T_{OFF}$. The output voltage of multiplying stage 102 is taken at the node, also referred to as terminal 112, between capacitor 176 and resistor 178.

The second Multiplying circuit 104 is implemented by components similar to those of Circuit 102. Then the signal is taken to a filtering and buffer stage 190, and then to an operational amplifier 192 that is configured as an amplifier and inverter.

The Over Voltage Detection circuit of FIG. 1 is implemented in the circuit of FIG. 6 by a transistor 194 that generates an overvolt signal. The signal is applied by a transistor 196 to opamp 192 in such a way that it effectively overrides the output value of the factoring circuit. It is further preferred that transistor 196 be a MOSFET, configured such that its intrinsic drain—source diode acts as a diode limiter.

In view of the present description, a person of ordinary skill in the art will discern how the individual power output requirements of each prospective application will dictate some trivial design choices (e.g. specific component values) for constructing a switched mode power supply circuit according to the invention.

In the above description numerous details have been set forth in order to provide a more thorough understanding of the present invention. It will be obvious, however, to one skilled in the art that the present invention may be practiced without these specific details. In other instances, well known features have not been described in detail in order to not obscure unnecessarily the present invention.

The invention claimed is:

1. A power supply circuit for producing a direct current output voltage from an input direct current voltage comprising:

first and second power input terminals for receiving the input voltage thereacross;

an inductor having a first terminal coupled to the first power input terminal and having an output terminal;

a power switch having a first terminal coupled to the second power input terminal and having an output terminal coupled to the inductor output terminal, the power switch being responsive to a closing switching signal for coupling the inductor output terminal to the second power input terminal thereby causing the magnitude of a current through the inductor to increase, the power switch being further responsive to a opening switching signal for uncoupling the inductor output terminal from the second power input terminal thereby causing the magnitude of a current through the inductor to decrease;

energy storage means having a first terminal and having an output terminal, the first terminal being coupled to the first inductor terminal, the output terminal being coupled to the inductor output terminal for receiving and storing energy transmitted from the inductor to the energy storage means; and a support circuit coupled to the power switch, the support circuit capable of producing switching signals in such a way that they are applied to the power switch, the support circuit including inductor current sensing means for sensing a magnitude of the inductor current and a durations ratio, the durations ratio equaling a fall time duration of a recent decrease of the inductor current divided by a rise time duration of a recent increase of the inductor current, the support circuit including means for computing a maximum inductor current from at least the durations ratio, the support circuit including current comparing means for comparing the inductor current magnitude to reference currents and for producing a closing switching signal when the inductor current magnitude becomes not greater than a zero reference current that approximately equals a zero current and an opening switching signal when the inductor current magnitude becomes not less than a maximum reference current that approximately equals the maximum inductor current;

thereby a direct current output voltage being formed across the terminals of the energy storage means.

2. The circuit of claim 1, wherein the inductor is formed as a first winding on a transformer, and wherein the support circuit is powered by a power winding formed on the transformer.

3. The circuit of claim 1, wherein the inductor is formed as a first winding on a transformer, and wherein the inductor current sensing means includes a comparator and a sense winding formed on the transformer.

4. The circuit of claim 1, wherein the support circuit includes means for monitoring an output potential difference between the output voltage and a predetermined nominal output voltage, and wherein the computing means computes the maximum inductor current also from the output potential difference.

5. The circuit of claim 4, wherein the means for monitoring the output potential difference includes a slow reacting circuit for adjusting, if the output potential difference starts to deviate from zero slowly, the computed value of the maximum inductor current thereby returning the output potential difference to zero.

6. The circuit of claim 4, wherein the means for monitoring the output potential difference includes a fast reacting circuit for adjusting, if the output potential difference changes suddenly, the computed value of the maximum reference current to near zero.

7. The circuit of claim 1, wherein the current comparing means includes:

a reference current selecting means having at least two input terminals and an output terminal, the selecting means responsive to event control signals for selecting one of the input terminals to be coupled to the output terminal, and wherein at the first selecting means input terminal there is applied a signal corresponding to the computed maximum reference current, and wherein at the second selecting means input terminal there is applied a signal corresponding to the zero reference current; and a comparator with two input comparing terminals, the first input comparing terminal coupled to the output terminal of the selecting means, the second input comparing terminal coupled to the current sensing means, the comparator further having an output terminal for producing switching signals and for producing event control signals suitable for selecting the first selecting means input terminal when the inductor current is increasing and for selecting the second selecting means input terminal when the inductor current is decreasing.

8. The circuit of claim 1, wherein the support circuit computing means includes a factoring circuit that multiplies together a preselected constant current value, the durations ratio, and the sum of the durations ratio.

9. The circuit of claim 8, wherein the factoring circuit includes two pulse width multiplying circuits, each multiplying circuit including at least two signal input terminals, a duration sense terminal and two signal output terminals, each multiplying circuit being capable of receiving an input signal voltage across the signal input terminals and a digital pulsed signal at the duration sense terminal, the pulsed signal defining a duty ratio, each multiplying circuit thereby producing across its signal output terminals an output signal voltage proportional to the input signal voltage multiplied by the duty ratio, the signal input terminals of the first multiplying circuit receiving across them a voltage proportional to the constant current value, the factoring circuit further including an operational amplifier and an intermediate resistor, a first input terminal of the operational amplifier being coupled to the first signal output terminal of the first multiplying circuit, a second input terminal of the operational amplifier being coupled to the second signal output terminal of the first multiplying circuit through the intermediate resistor, the second input terminal of the operational amplifier being further coupled to a first signal output terminal of the second multiplying circuit, the output terminal of the operational amplifier being coupled to the first signal input terminal of the second multiplying circuit.

10. The circuit of claim 9, further including a reference terminal maintained at a fixed reference voltage, and wherein the duty ratio of the pulsed signal corresponds to the durations ratio, and wherein the second signal input terminal of the first multiplying circuit is coupled to the second signal input terminal of the second multiplying circuit, and wherein each multiplying circuit includes:

a current resistor having first and second terminals, the first terminal being coupled to the first signal input terminal, a reference transistor having a collector terminal, a base terminal forming the second signal input terminal and an emitter terminal, the emitter terminal being coupled to the second current resistor terminal, the base terminal being coupled to the reference terminal, a second resistor having a first terminal coupled to the collector terminal of the reference transistor and a second terminal coupled to the first signal output terminal, a capacitor having a first terminal coupled to the first signal output terminal, and a second terminal coupled to the second signal output terminal, and a duration transistor having a control terminal and two current carrying terminals, the control terminal being coupled to the duration sense terminal, the first current carrying terminal being coupled to the collector terminal of the reference transistor, and the second current carrying terminal of the duration transistor being coupled to the second signal output terminal, the duration transistor thereby coupling the reference transistor collector terminal to the second signal output terminal when the inductor current is increasing, the duration transistor thereby uncoupling the reference transistor collector terminal from the second signal output terminal when the inductor current is decreasing.

* * * * *

UNITED STATES PATENT AND TRADEMARK OFFICE
CERTIFICATE OF CORRECTION

PATENT NO. : 6,037,754          Page 1 of 1
DATED       : March 14, 2000
INVENTOR(S) : Harper It is certified that error appears in the above-identified patent and that said Letters Patent is hereby corrected as shown below:

Column 6,

Line 32, change "$T_3$" to -- T3 --;

Line 42, "(during $T_{OFF}$)" is not part of Equation (1);

Line 53, "(during $T_{ON}$)" is not part of Equation (2);

Column 7,

Equation (6), change "$I_{PEAK} X I_\theta$" to -- $I_{PEAK} = I_\theta$ --;

Column 8,
Line 4, change "Peales" to -- Peaks --;
Line 25, change "rely" to -- very --;

Column 9,
Line 38, change "shosw" to -- shown --;
Line 60, change "values" to -- value --; and Column 11,
Line 1, change "a opening" to -- an opening --.

Signed and Sealed this

Twenty-ninth Day of January, 2002

*Attest:*

*Attesting Officer*

JAMES E. ROGAN
*Director of the United States Patent and Trademark Office*